C. E. WARNER.
Churn.
No. 65,623. 　　　　　　　　　　　　　Patented June 11, 1867.
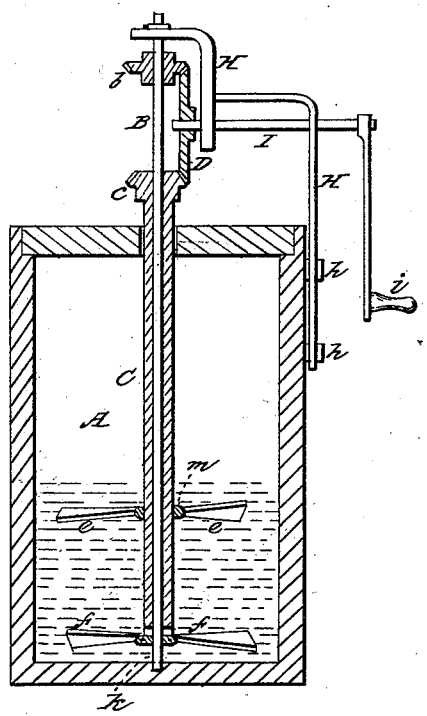
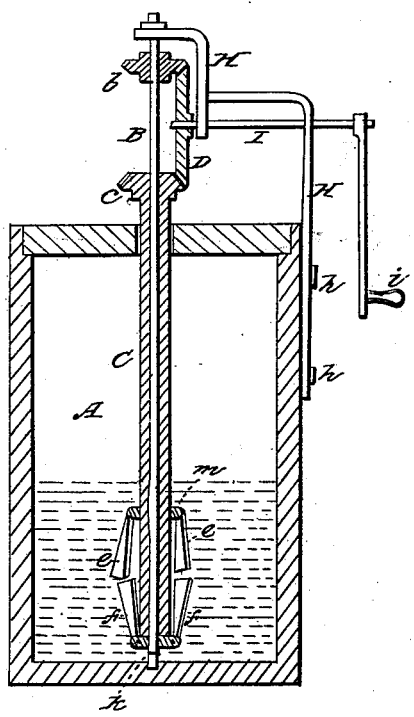
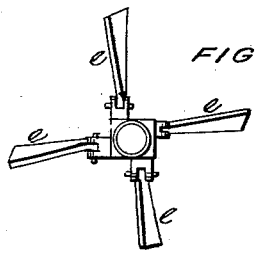
WITNESSES:
H. A. Morley
Wm F. Palmer
INVENTOR:
C E Warner

United States Patent Office.

CHAUNCEY E. WARNER, OF SYRACUSE, NEW YORK.

Letters Patent No. 65,623, dated June 11, 1867.

CHURNS.

The Schedule referred to in these Letters Patent and making part of the same.

TO ALL WHOM IT MAY CONCERN:

Be it known that I, CHAUNCEY E. WARNER, of Syracuse, in the county of Onondaga, and State of New York, have invented a new and useful Improvement in Churns; and I do hereby declare that the following is a full, clear, and exact description thereof, which will enable those skilled in the art to make and use the same, reference being had to the accompanying drawings, forming part of this specification, in which—

Figure 1 is a central vertical section with the dashers thrown out by a forward motion, as when churning.

Figure 2 is a like view with the dashers thrown in by a backward motion.

Figures 3 and 4 are detail views.

Similar letters of reference indicate corresponding parts in all the figures.

This invention relates to certain new and useful improvements in the construction of churns, whereby an efficient and easily operated machine is produced, as hereinafter explained.

In the accompanying drawings, A is the body of the churn; B is a shaft working within a hollow shaft, C, and has a set of dashers, $f f$, hinged to its lower end; C is a hollow shaft having a set of dashers, $e e$, hinged or pivoted thereto; $b$ is a pinion fixed on the upper part of shaft B; and $c$ is a pinion fixed on the upper end of shaft C. These pinions gear with opposite sides of a bevelled driving-wheel, D, so that the shafts B C rotate in opposite directions. The shaft I of the driving-wheel D is held in a standard, H, which is supported in a detachable manner by pins or loops $h h$ on the side of the churn, so that the supports for the driving devices are entirely independent of the cover of the churn. The dashers or beaters $e e$, $f f$ are hinged or pivoted to their respective shafts so as to move from a horizontal to a vertical position when the motion of the crank $i$ is reversed, and are set at an oblique angle, as shown by figs. 3 and 4. The shaft B has a small air passage through its centre, from its top to the small side openings $k$, (figs. 1 and 2,) near the bottom of the churn. The upper hub $m$, to which the beaters $e$ are attached, is adjustable vertically on its shaft C by means of a set-screw.

Its operation is as follows: The upper beaters $e$ are adjusted vertically on shaft C, so as to have a plane of rotation near the surface of the cream, and the cream is then placed in the churn. A forward motion then being given to the beaters they all take a horizontal position, and the upper and lower sets revolving in opposite directions tend to counteract a rotary motion of the cream, so that the beaters strike it with more force, and owing to the oblique faces of the two sets of beaters they are constantly throwing the cream toward each other, and thereby thoroughly agitate and beat the whole mass. When the cream has been sufficiently churned, the butter is collected or gathered into a mass by a vibratory or alternate forward and back motion of the driving devices, which causes the beaters to move constantly from a horizontal to a vertical position, (as seen in fig. 2,) and back again to a horizontal position, and by this means the gathering is done very efficiently. When a high speed is given to the machine, the upward throw of the beaters $f$ with the centrifugal tendency of the cream at the bottom of the churn causes intermittently a vacuum in the cream at the bottom of shaft B, so that air flows down the air passage in its centre and out of the openings $k$ and mingles with the cream, and thus facilitates the operation.

Having thus described my invention, what I claim as new, and desire to secure by Letters Patent, is—

1. I claim the hinged beaters $e f$, in combination with the shafts B C, and gears $b c$ D, all constructed and operating as and for the purpose herein shown and described.

2. In connection with the above I claim also the sliding hub $m$ for adjusting the upper beaters to varying quantities of cream, as and for the purpose set forth.

The above specification of my invention signed by me this 17th day of April, 1867.

CHAUNCEY E. WARNER.

Witnesses:
F. A. MORLEY,
HARRY GIFFORD.